United States Patent [19]

Yamada

[11] Patent Number: 5,142,382
[45] Date of Patent: Aug. 25, 1992

[54] DOCUMENT READER

[75] Inventor: Syuji Yamada, Hyogo, Japan

[73] Assignee: Mita Industrial Co., Ltd., Osaka, Japan

[21] Appl. No.: 369,315

[22] Filed: Jun. 21, 1989

[30] Foreign Application Priority Data

Jun. 22, 1988 [JP] Japan .................................. 63-153835

[51] Int. Cl.$^5$ ............................................. H04N 1/04
[52] U.S. Cl. ...................................... 358/498; 358/497
[58] Field of Search ............... 358/498, 497, 494, 486, 358/413, 423, 421, 474; 355/235

[56] References Cited

U.S. PATENT DOCUMENTS 4,731,657  3/1988  Miyagi ................................ 358/497

Primary Examiner—Edward L. Coles, Sr.
Assistant Examiner—Thomas D. Lee
Attorney, Agent, or Firm—Koda and Androlia

[57] ABSTRACT

A document reader in which means for feeding in/out feeds a document into the fixed reading position and feeds it out from there, a reading unit reads the document by scanning, and means for scanning/returning makes the reading unit scan along the document and makes it return to its home position.

1 Claim, 6 Drawing Sheets

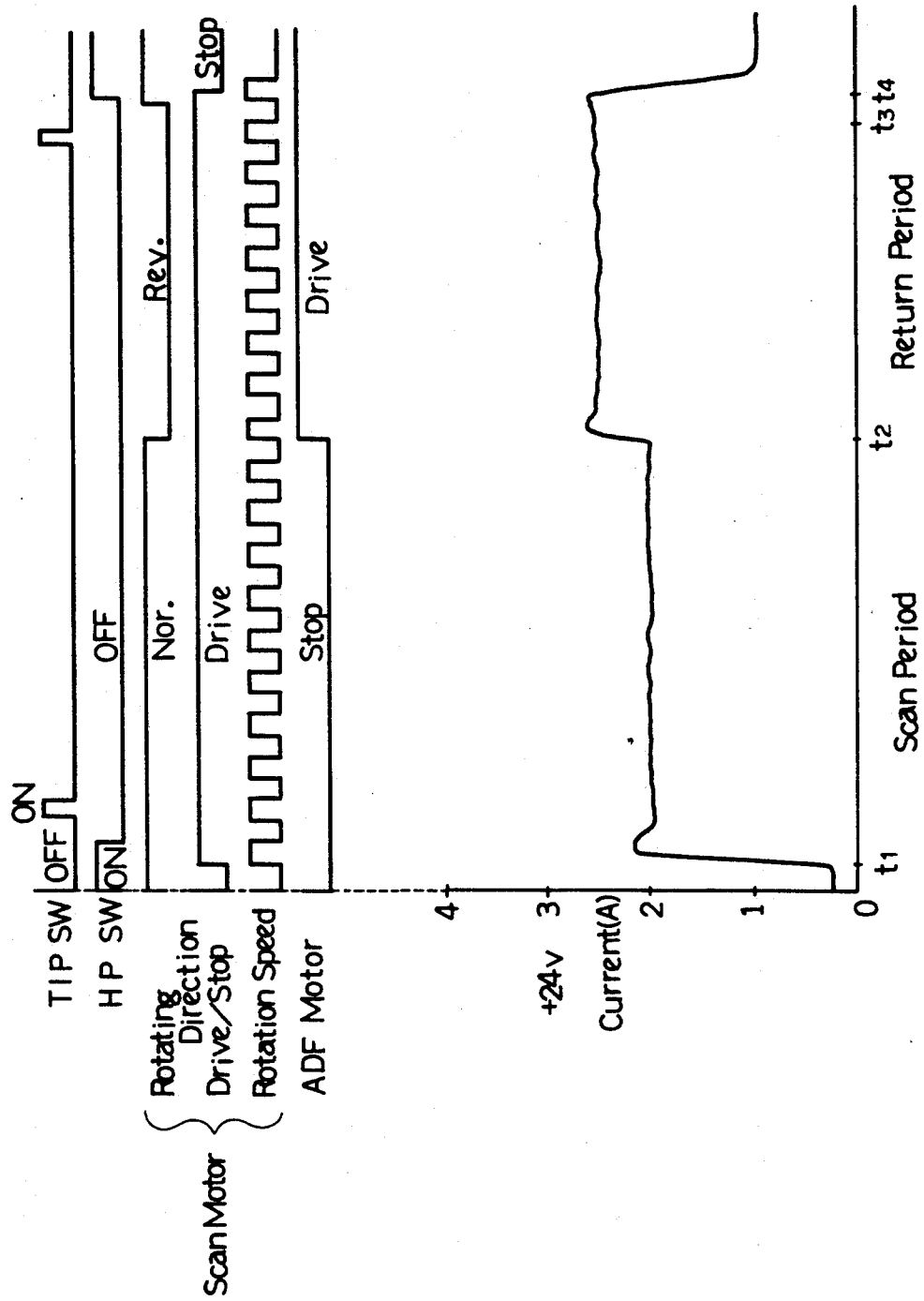

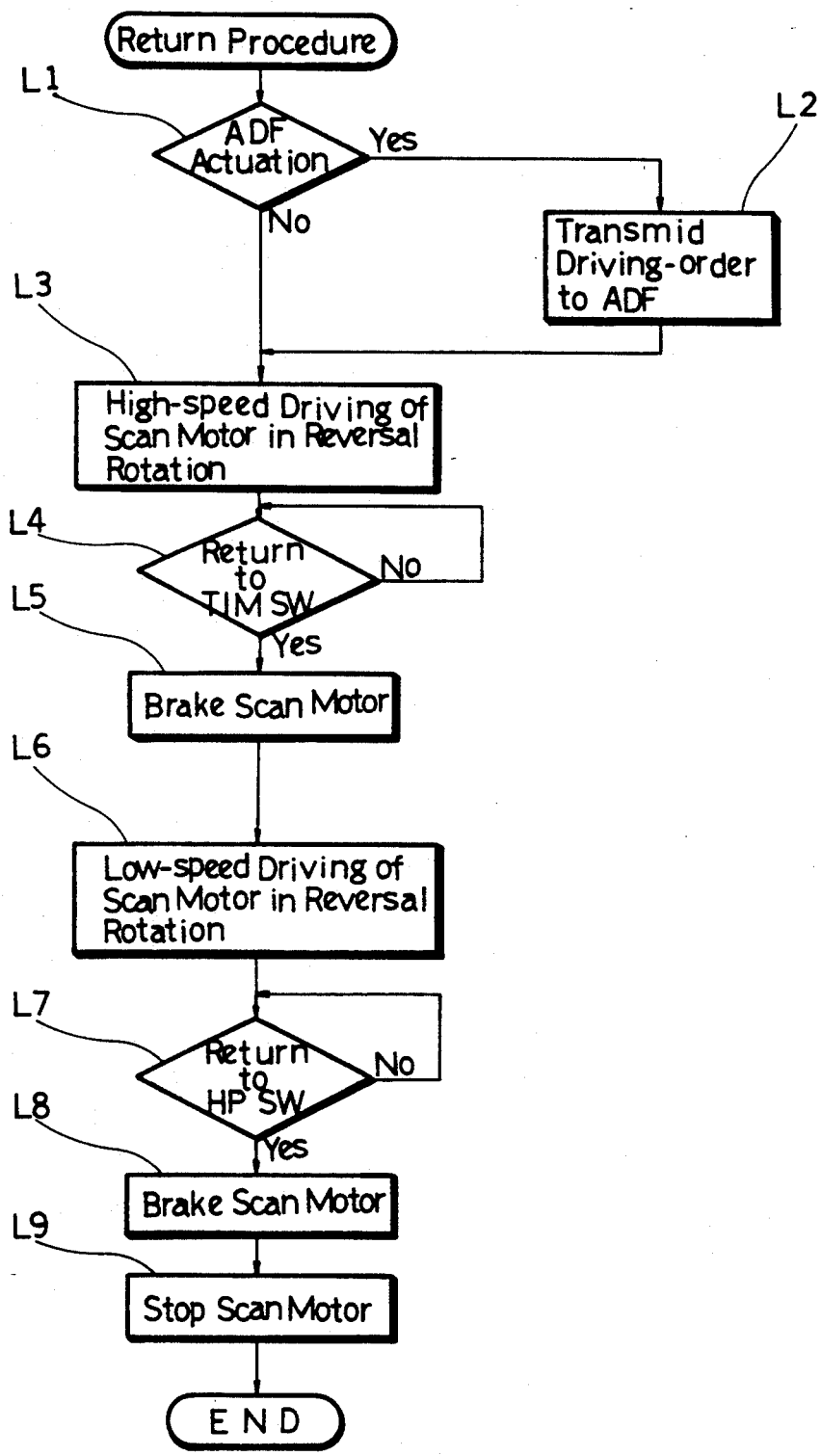

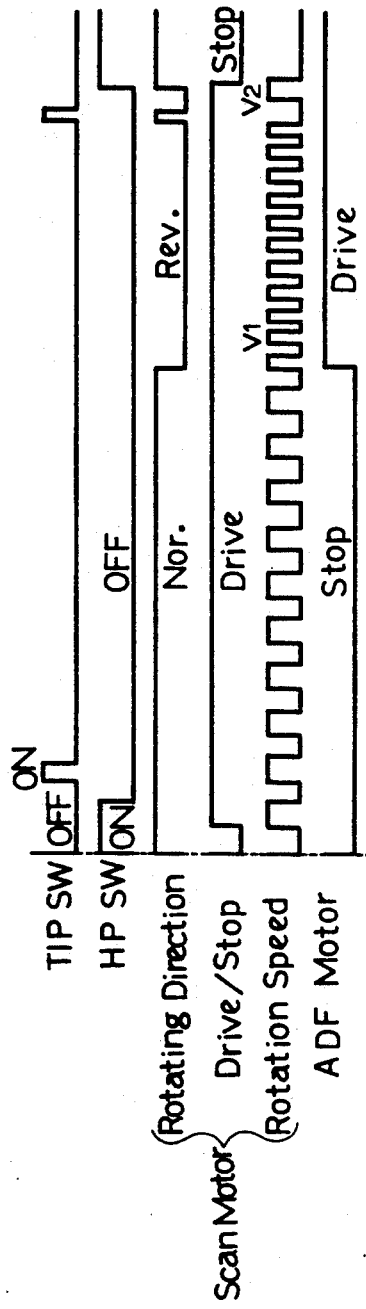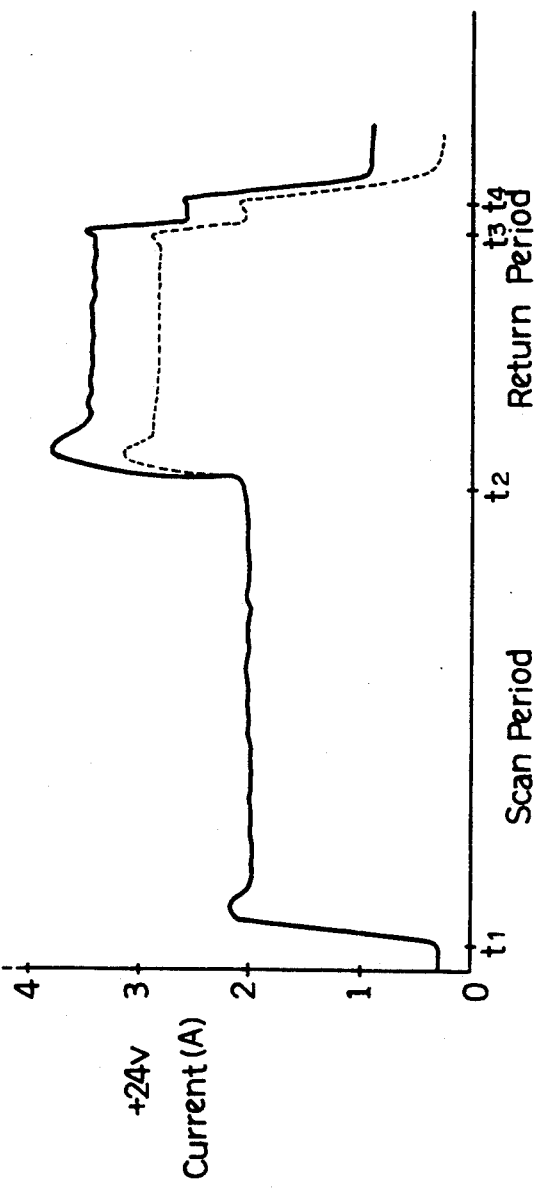
FIG. 6 [Prior Art]

DOCUMENT READER

BACKGROUND OF THE INVENTION

1. Field of the Invention

The present invention relates to a document reader, or particularly to a document reader so as to read a document in an image forming apparatus such as a copying machine.

2. Description of the Prior Art

The principal part of a copying machine with a document reader is shown in FIG. 1 and FIG. 2.

One of the documents set on the document tray 12 is uptaken in the body of the copying machine 1 by a feed roller 13, and is carried to the fixed reading position on the document glass plate 5 by a feed in/out roller 14. Such feed roller 13 and feed in/out roller 14 are actuated by ADF motor 17.

The document is read by one-way movement of a reading unit 4 along the underside of the document glass plate 5 so as to scan the overall document. The reading unit 4 is moved by means of a scan motor 23, e.g. servomotor or stepping motor. After reading, the document is fed out from the document glass plate 5 into a document assist tray 16 by the reversing actuation of the feed in/out roller 14. Afterwards the reading unit 4 returns to its home position.

A main control circuit 2 of the copying machine 1 detects the switch-status of a paper-feed resist switch 3, TIM switch 25, and HP switch 26. In accordance with the results of each switch-status, the main control circuit 2 controls an ADF motor 17 by means of a ADF motor control circuit 18 provided between them, and controls a scan motor 23 by interstice of a scan motor control circuit 24 between them.

The power, making the ADF motor 17 and the scan motor 23 actuate, is supplied to them from +24 V power source 8 in a power circuit 7.

Means for feeding in/out a document (as described ADF hereinafter) is generally composed of the document tray 12—the ADF motor control circuit 18 and common components, e.g. the main control circuit 2 and the power circuit 7, and means for scanning/returning is generally composed of the scan motor 23—HP switch 26 and said common components.

Now the scan motor 23 is controlled in accordance with the procedure of a flowchart shown in FIG. 5 when a reading unit 4 of a conventional document reader is returning to its home position. In the first place, it is judged whether the ADF is driven not to feed in and out a document (L1). The scan motor 23 is driven in the reversal rotation at a relative high speed non-actuation of the ADF (L3). Conversely, during actuation of the ADF, the actuation order signal is sent to it (L2).

After that, the scan motor 23 is driven in the reversal rotation at said speed (L3). At this time, the scanning speed $V_1$ of the reading unit 4, for instance about 300 mm/sec, is approximately equal to three times the speed in scanning a document at an equi-magnification copying.

After the reading unit 4 arrives at the TIM switch 25 (L4), the scan motor 23 is driven for normal rotation in a short time to brake the reading unit 4 (L5). Next the scan motor 23 is driven in the reversal rotation at a lower speed than that hitherto (L6). The scanning speed $V_2$, for instance about 100 mm/sec, is nearly equal to the speed in scanning a document at an equi-magnification copying at this time.

The scan motor 23 is driven again in the normal rotation for a short time to brake the reading unit 4 (L8) after the HP switch 26 detects a return of the reading unit 4 to its home position (L7). Afterwards the scan motor 23 should stop (L9).

As previously noted on the conventional document reader, the return speed of the reading unit 4 is independent of the actuation of the ADF.

In regard to the copying machine 1 mentioned above, the power is supplied to the ADF motor 17 and the scan motor 23 from +24 V power source 8.

The current for the return period $t_2$-$t_4$ increases as shown in FIG. 6.

Namely the current increases slightly as a broken line shown in FIG. 6 during high speed driving of only the scan motor 23 without a driving of the ADF motor 17, or increases markedly as a solid line in FIG. 6 during a high speed driving of the scan motor 23 with a driving of the ADF motor 17.

Therefore it causes a problem that +24 V power source 8 of large capacity is required for the case when high speed driving of the scan motor 23 with a driving of the ADF motor 17 occurs. For this reason, it also causes the problem that a loss of the power consumption becomes large.

SUMMARY OF THE INVENTION

The present invention was made to solve the conventional problems as stated above.

It is hence the general object of this invention to provide a document reader with the characteristics of a small power loss and a light power capacity required. That is to say, the present invention will provide a document reader, wherein means for feeding in and out a document to and from the fixed reading position, a reading unit which reads the document by scanning, and means for scanning and returning makes the reading unit scan along the document and makes it return to its home position are included, characterized by comprising means for switching the returning speed of the reading unit switching to the relative high speed on re-scanning the same document and switching to the relative low speed when the means for feeding in and out a document under is actuated during return of the reading unit.

As in the function of a document reader related to the present invention, for example, the return speed of the reading unit 4 should be established at a high value relatively similar to conventional one in case the reading unit 4 repeatedly scans several times along the same document.

Accordingly the time required becomes short to read a document continuously. At this time, a large amount of current should not be consumed owing to non-actuation of means for feeding in and out a document.

Next the return speed should be established at a relatively low value during actuation of the means for feeding a document in and out. Therefore since the share of the supplied power with means for scanning and returning does not increase very much notwithstanding increase of the share of those with means for feeding in and out a document, the total current value will become smaller than in case the reading unit 4 returns at the relative high speed.

After all, the document reader related to the present invention should not require a large power capacity, and could have a little loss of power.

While the specification concludes with claims particularly pointing out and distinctly claiming the subject-matter of the invention, it is believed the invention will be better understood from the following description taken in connection with the accompanying drawings in which:

BRIEF DESCRIPTION OF THE DRAWINGS

FIG. 4 is a waveform graph of some part in the circuit shown in FIG. 2;

FIG. 5 is a flowchart showing the conventional procedure of actuation of the document reader in its return; and FIG. 6 is a waveform graph, similar to that of FIG. 4, obtained as a result of the execution based on said conventional procedure.

DETAILED DESCRIPTION OF THE PREFERRED EMBODIMENT

Figure 1:
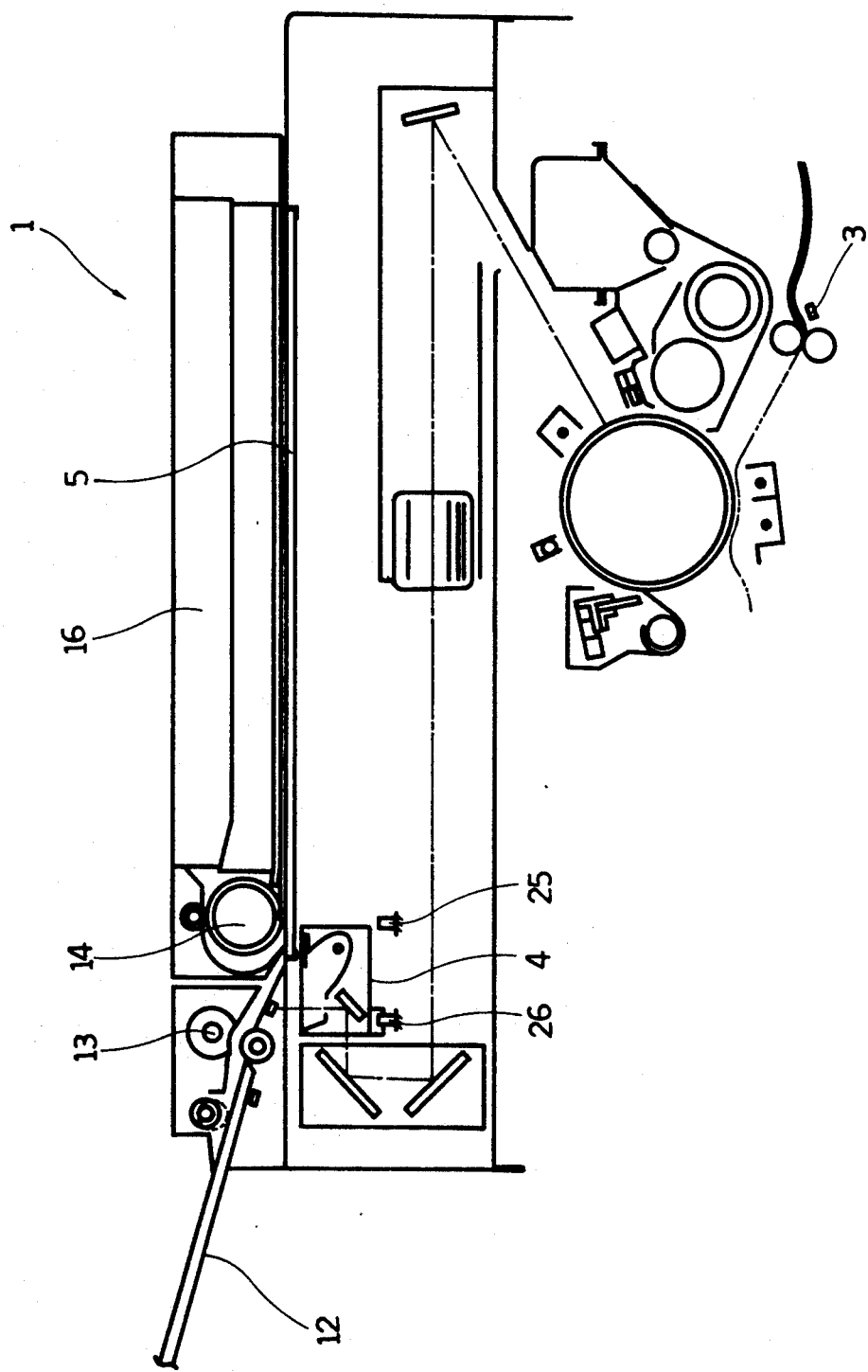
FIG. 1 is a sectional part of the principle part in a copying machine with a document reader.
Figure 2:
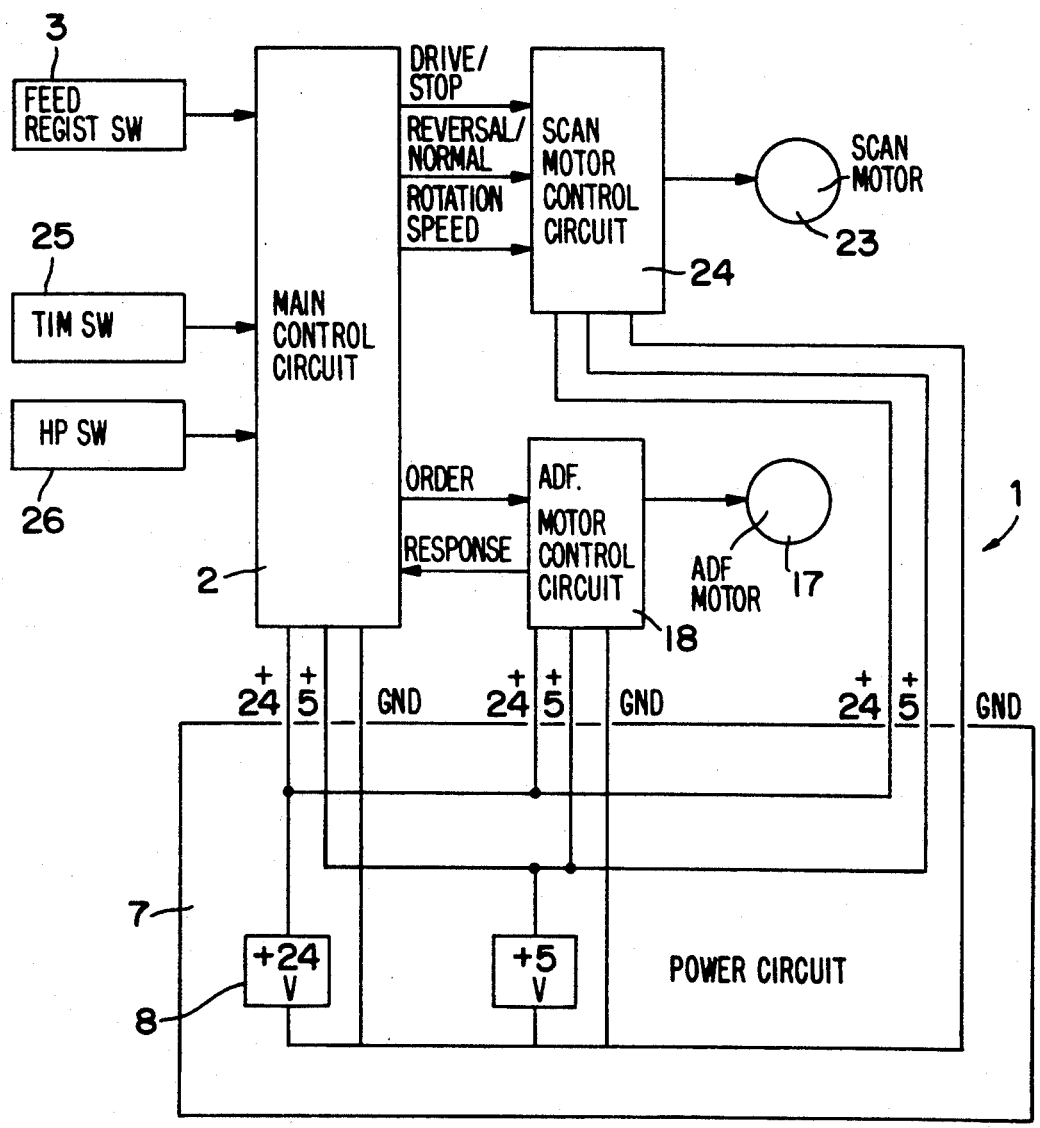
FIG. 2 is a diagram of the principle circuit controlling the copying machine.

FIG. 1 and FIG. 2 show the principal parts of the general composition of a document reader and copying machine. These principal parts comprise a main control circuit 2 of the copying machine 1 which detects the switch status of a paper-feed resist switch 3, TIM switch 25, and HP 26. In accordance with the results of each switch-status, the main control circuit 2 controls the ADF motor 17 by means of an ADF motor control circuit 18 provided between them and controls a scan motor 23 by means of a scan motor control circuit 24 provided between them.

The power making the ADF motor 17 and the scan motor 23 actuate is supplied to them from a +24 volt power source 8 in a power circuit 7.

Figure 3:
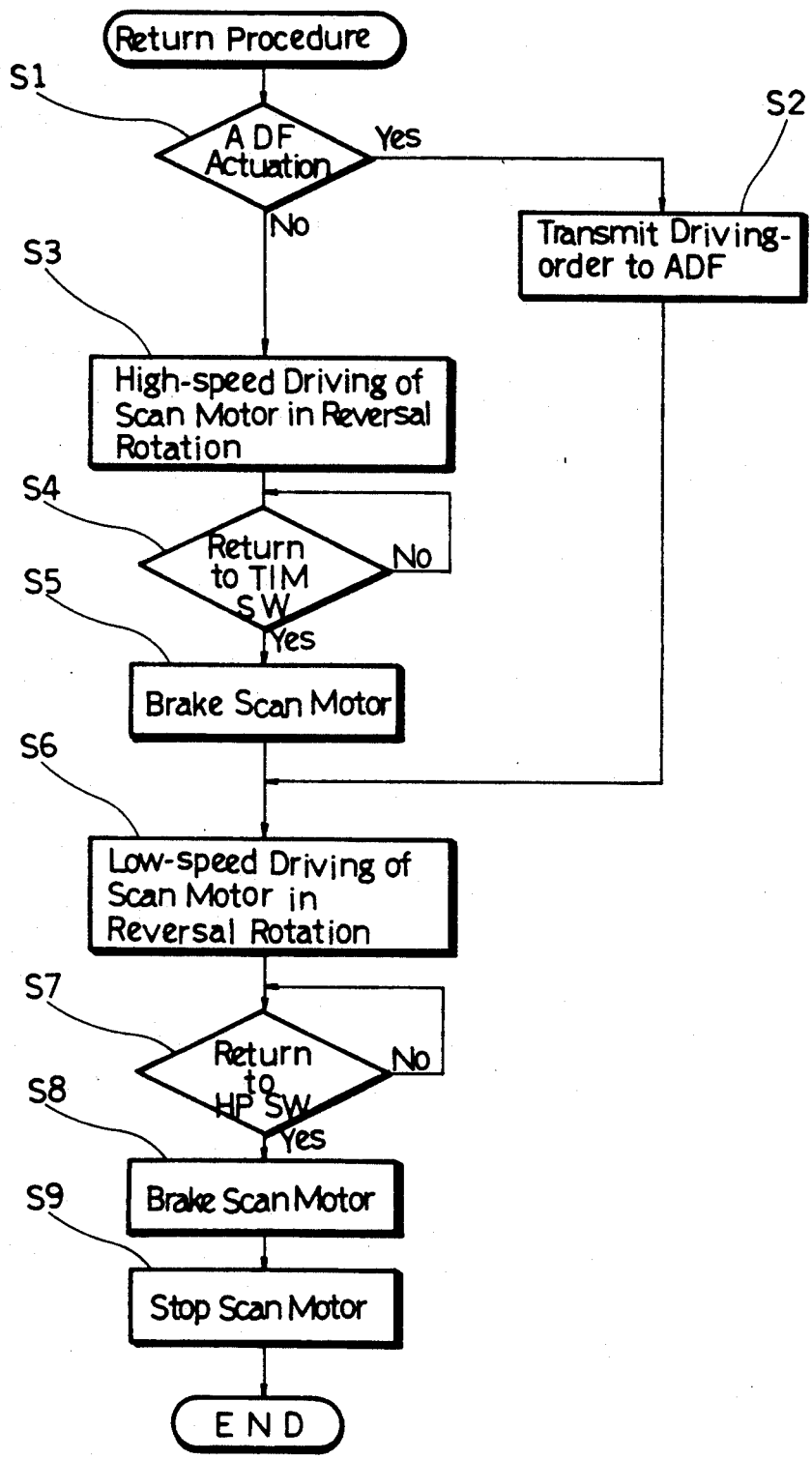
FIG. 3 is a flowchart showing the procedures of actuation of the document reader related to the present invention.

Means for feeding in/out a document (hereinafter described as the ADF) is generally composed of a document tray 12, ADF motor control circuit 18 and, components, i.e. the main control circuit 2 and the power circuit 7, and means for scanning/returning is generally composed of the scan motor 23, HP switch 26 and, components. The essential functions and construction of the present invention will be explained by referring to FIG. 3 and described in the follow paragraphs.

The conclusion of the reading scan along a document with the reading unit 4 is detected by means of the detection of the paper rear end with a feed resist switch 3. Thereupon "return procedure" should be started.

First the status of the actuation of the ADF (S1) is checked. Explaining the concrete details of the judgement, the main control circuit 2 judges that the ADF should be driven when a signal to drive the ADF is inputted and a signal for re-scanning the document fed into the fixed position on the document glass plate for continuing a copy operation for one document is not inputted and the main control circuit 2 determines if the ADF should not be driven in other cases the actuation of the ADF is judged in case of the direction of the ADF employment and of non-execution of re-scanning along the document, or is not judged except the foregoing case. The scan motor 23 will be driven in the reversal rotation at a relative high speed during non-actuation of the ADF, and the reading unit 4 will return at a relative high speed, e.g., 300 mm/sec (S3).

After the passage of the reading unit 4 is detected by operation of the TIM switch 5 (S4), the scan motor 23 is driven in normal rotation for a short time. By this normal rotation of the scan motor 23, the reading unit 4 running in the returning direction is braked (S5).

In the second place, the scan motor 23 is driven in the reversal rotation at a relative lower speed than that up to present, and the reading unit 4 returns at the lower speed $V_2$ (for instance, 100 mm/sec).

When the arrival of the reading unit 4 at its home position is detected by the HP switch 6 (S7), the scan motor 23 is driven in the normal rotation for a short time to brake the reading unit 4 (S8), and in the next step, the scan motor 23 should stop (S9).

The above-said actuation of high speed return is similar to the conventional one, so the effect of shortening the required time is obtained in the continuous copying of the same document. At that time, a +24 V power source 8 is not required to have a large current capacity since the ADF should not be actuated. The current waveform on +24 V power source 8 is shown as a broken line in FIG. 6.

In succession, judging the actuation of the ADF (S1), the actuation order signal is sent to the ADF (S2), and the scan motor 23 is driven in the reversal rotation at a relative low speed (S6). The speed of the scan motor 23 at this time is equal to that after the reading unit 4 at its relative high speed return passed by the TIM switch 25.

The switching of the speed of the reading unit 4 just having passed by the TIM switch 25 is not necessary because of the driving of the scan motor 23 based on above-stated procedure, so the control for the scan motor 23 becomes easy. Without restriction of the operational condition mentioned above, however, the speed of the scan motor 23 may be more than the minimum speed at which the reading unit 4 can return while the ADF feeds a document in and out, but may be less than the maximum one which would not carry an excessive load on the power source. Also the speed of the scan motor 23 may be changed according to the moving distance of the reading unit 4 during scanning.

Furthermore, the scan motor 23 is driven in the normal rotation in a short time at brake the reading unit 4 after the arrival of the reading unit 4 to its home position is detected by the HP switch 26 (S7), and the scan motor 23 stops (S9). The current waveform of +24 V power source 8 at this time is shown in FIG. 4. In the return period $t_2-t_4$ therein, the current required only for the ADF increases more than that in the scan period $t_1-t_2$. Therefore the required power should be less than that of the conventional device. As mentioned above, the capacity of +24 V power source 8 may be relatively small, and the loss of power may become smaller because the current for driving the ADF motor 17 and that for driving the scan motor 23 at high-speed are not required at the same time.

According to the document reader related to the present invention in the foregoing embodiment, the same-time execution of the actuation of means for feeding in/out a document and of means for scanning and returning at high-speed return can be avoided. Therefore a large amount of current does not flow, a power source with a large capacity is not required, and a loss of power can be decreased.

Furthermore, the in the conventional device the image forming apparatus possessing the ADF as an option must initially have a power source unit with large capacity in order to supply the power to the ADF. For that reason, the power source unit has low efficiency without the attachment of the ADF to said apparatus.

However the loss of power in an apparatus utilizing the present invention can become less even in case the ADF is not attached because the required capacity of the power source unit can become lower by means of the present invention.

This invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

I claim:

1. A document reader, wherein means for feeding in/out a document to/from a fixed reading position, a reading unit which reads the document by scanning the document, and means for scanning/returning which makes said reading unit scan along the document and makes it return to its home position are provided, characterized by comprising:

a first means for switching a returning speed of said reading unit to a first speed on re-scanning said same document and a second means for switching a returning speed of said reading units to a second speed when said means for feeding in/out a document is actuated during return of said reading unit, said second speed being substantially slower than said first speed.

* * * * *